United States Patent
Musuvathi et al.

(10) Patent No.: US 7,606,774 B2
(45) Date of Patent: Oct. 20, 2009

(54) COMPUTER IMPLEMENTED COVER PROCESS APPROXIMATING QUANTIFIER ELIMINATION

(75) Inventors: Madanlal S. Musuvathi, Bellevue, CA (US); Sumit Gulwani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 11/425,642

(22) Filed: Jun. 21, 2006

(65) Prior Publication Data

US 2007/0299793 A1    Dec. 27, 2007

(51) Int. Cl.
*G06F 15/18*    (2006.01)

(52) U.S. Cl. .................. 706/14; 716/2; 716/3; 703/2

(58) Field of Classification Search .............. None
See application file for complete search history.

(56) References Cited

U.S. PATENT DOCUMENTS

| 2004/0064794 A1* | 4/2004 | Yang ............... 716/2 |
| 2005/0240885 A1* | 10/2005 | Ganai et al. ............ 716/3 |

* cited by examiner

*Primary Examiner*—David R Vincent
*Assistant Examiner*—Kalpana Bharadwaj
(74) *Attorney, Agent, or Firm*—Vierra Magen Marcus & DeNiro LLP

(57) ABSTRACT

A computer implemented cover process is disclosed for use in program analysis and verification techniques where existential quantifier elimination is not possible. The cover process allows an accurate assessment of the viability of a theory. Where a theory can be described using quantifier-free formulas, it can be shown that the program analysis and verification techniques using cover are not only sound (i.e., an indication of validity is reliable), but also precise (i.e., and indication of an error is reliable).

9 Claims, 3 Drawing Sheets

COMPUTER IMPLEMENTED COVER PROCESS APPROXIMATING QUANTIFIER ELIMINATION

BACKGROUND

A significant objective of program analysis and verification is to determine that a given software code performs its intended functions correctly, to ensure that it performs no unintended functions, and to provide information about its quality and reliability. Flaws in the overall design of software generally lead to bugs and problems in the implementation of the software. Several techniques currently exist for verifying software design and requirements. Two well known techniques include symbolic model checking and abstract interpretation.

Qualitatively, symbolic model checking involves the definition of system requirements or design (called models) and a property (called the specification) that the final system is expected to satisfy. The model checking construct indicates whether a specified model satisfies given specifications, and if it does not, indicates why the model does not satisfy the specification. Abstract interpretation consists of providing several semantics linked by relations of abstraction. A semantic is a mathematical characterization of the possible behaviors of the program.

At a fundamental level, program analysis and verification techniques such as model checking and abstract interpretation make use of existential quantifier elimination. An existential quantifier is a logical symbol "∃" that allows potential simplification of a formula by eliminating some set of variables V from the formula.

Given a quantifier-free formula $\phi$ and a set of variables V, existentially quantifying away V involves computing a quantifier-free formula that is logically equivalent to $\exists V: \phi$. This operation is useful in practice to eliminate variables that are no longer necessary from a formula. For instance, the image computation in symbolic model checking involves computing the quantifier-free formula equivalent to $\exists V: R(V) \wedge T(V, V')$. Here, R(V) represents the current set of reachable states and T (V,V') represents the transition relation between the current values of the state variables V and their new values V'. Existential Quantifier Elimination is also useful in computing the strongest postcondition across an assignment node in abstract interpretation, wherein the invariant I' after an assignment node x:=e is obtained from the invariant I before the assignment node by performing the following computation: $\exists x': I[x'/x] \wedge x = e[x'/x]$.

Existential quantifier elimination can be performed, albeit with exponential complexity, for propositional formulas. However, this operation is not defined for formulas containing interpreted symbols from certain theories. For example, consider the formula F(x)=0 in the theory of uninterpreted functions. There is no quantifier-free formula that is equivalent to $\exists x: F(x)=0$ as it is not possible to state that 0 is in the range of function F without using quantifiers. Similarly, the theory of lists and the theory of arrays do not admit existential quantifier elimination. This limits the application of techniques like symbolic model checking to systems described by formulas in these theories.

There exist techniques to approximate existential quantifier elimination when it does not exist (as in the above-cited instances of uninterpreted formulas, the theory of lists and the theory of arrays). Such techniques guarantee soundness in performing program analysis and verification techniques. That is, when these approximations indicate that a program verifies true, that is an accurate result. These approximations are disclosed for example in the publications T. Ball and S. K. Rajamani, "The SLAM project: Debugging system software via static analysis," In 29th Annual Symposium on POPL, pages 1-3, 2002, and S. Chaki et al., "Modular verification of software components in C," Transactions on Software Engg., 30(6):388-402, 2004.

However, conventional approximation theories are not precise in performing program analysis and verification techniques where existential quantifier elimination is not possible. That is, they can on occasion give a false indication that a program embodies a flaw, when in fact it does not.

SUMMARY

The present system, roughly described relates to a cover process and methods of applying the cover process. The cover process may be used in program analysis and verification techniques where existential quantifier elimination is not possible. The cover process allows an accurate assessment of the viability of a system, both in verifying the validity and falsity of the system. Where a system is known to include an error, a program analysis and verification technique using cover may demonstrate where the error occurs in the system.

Typically, existential quantifier elimination is used in program verification techniques such as symbolic model checking to determine whether a computer program, or other system or model, is valid for its intended purposes or whether it has an error. However, on occasion, the program verification technique involves a formula for which existential quantifier elimination cannot be used. The present system relates to a computer implemented cover process for approximating formulas for which existential quantifier elimination may not be used. The cover process is capable of providing a result indicating whether a program, or other system or model, is valid for its intended purposes or whether it has an error.

The cover process may be implemented within a computing environment, and may provide a result which may be stored within and reported by the computing environment. As used herein, reporting the results may include, but is not limited to, displaying the results over a monitor associated with the computing environment, printing the results with a printer associated with the computing environment, sending the results to a speaker associated with the computing environment, communicating the result over a transmission medium, and sending the results to a file for storage or use by another application program.

The cover process can be used to reason about transition systems involving operations from the rich set of theories for which the cover operation is defined. When the transition system can be described using quantifier-free formulas, it can be shown that the symbolic model checking process using cover is not only sound (i.e., an indication of validity is reliable), but also precise (i.e., an indication of an error is reliable). A similar application is shown with respect to performing abstract interpretation of programs over abstractions whose elements are quantifier-free formulas describing program states.

The present system may further show how program analysis techniques using cover may be applied to useful theories that arise in program analysis and verification, including those that do not admit existential quantifier elimination. These theories include the theory of uninterpreted functions, the theory of lists and the theory of arrays. Cover is trivially defined for propositional formulas and theory of linear arithmetic, as cover, by definition, reduces to existential quantifier elimination when it exists. It is understood that embodiments of the present system may be used with program analysis techniques other than symbolic model checking and abstract interpretation, and it is understood that the present system may be used to approximate formulas that do not admit existential quantifier elimination other than the theory of uninterpreted functions, the theory of lists and the theory of arrays.

The present system relating to cover processes may further be used to obtain a cover process for a combination of two theories $T_1 \cup T_2$ from the cover processes for theories $T_1$ and $T_2$. The combination methodology is an extension of the known Nelson-Oppen methodology for combining decision procedures. In the combination framework for cover processes, conditional variable equalities (of the form $\gamma \Rightarrow v_1 = v_2$) and variable-term equalities (of the form $\gamma \Rightarrow v = t$) are exchanged between component theories (while in the Nelson-Oppen framework only variable equalities are exchanged between component theories). The combination process works for theories that are convex, stably infinite, disjoint, and have a finite set of simple terms, as defined hereinafter. The theories of linear arithmetic and uninterpreted functions, for example, satisfy these constraints.

DETAILED DESCRIPTION

Figure 1:
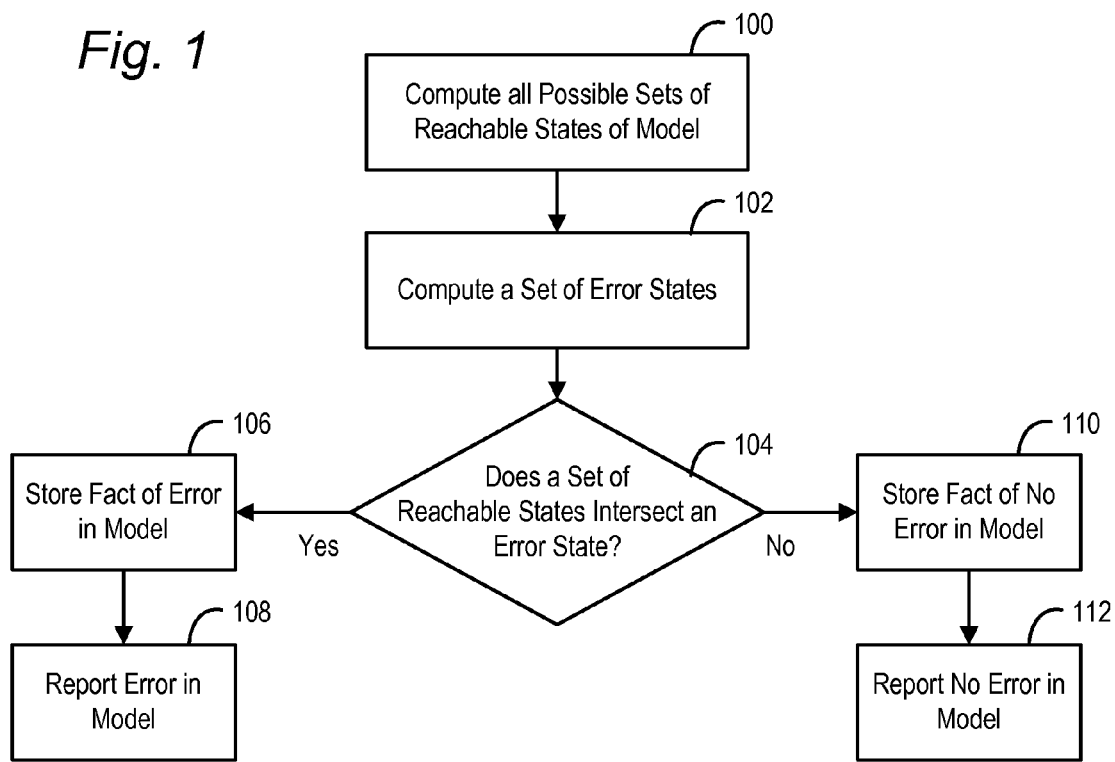
FIG. 1 is a flowchart of a method of model checking a model for validity and errors.

The present system will now be described with reference to FIGS. 1 through 5 which in general relate to the notion referred to herein as cover, and a process referred to herein as the cover process. In formulas where existential quantifier elimination is not possible, program analysis and verification techniques employing cover are not only sound, but they are precise. That is, when the analysis and verification process terminates, any error reported is guaranteed to be a real error in the system.

Typically, existential quantifier elimination is used in program verification techniques such as symbolic model checking to determine whether a computer program, or other system or model, is valid for its intended purposes or whether it has an error. However, on occasion, the program verification technique involves a formula for which existential quantifier elimination cannot be used. The present system relates to a computer implemented cover process for approximating formulas for which existential quantifier elimination may not be used. The cover process is capable of providing a result indicating whether a program, or other system or model, is valid for its intended purposes or whether it has an error.

The cover process may be implemented within a computing environment explained hereinafter with respect to FIG. 5, and may provide a result which may be stored within and reported by the computing environment. As used herein, reporting the results may include, but is not limited to, displaying the results over a monitor associated with the computing environment, printing the results with a printer associated with the computing environment, sending the results to a speaker associated with the computing environment, communicating the result over a transmission medium, and sending the results to a file for storage or use by another application program.

In the description that follows, the concept of cover is first explained. Next, description sets forth the specific application of cover to two known program analysis and verification techniques—symbolic model checking and abstract interpretation. In particular, a modified symbolic model checking process using the cover operation is presented. This new process can be used to reason about transition systems involving operations from the rich set of theories for which the cover operation is defined. As indicated, when the transition system can be described using quantifier-free formulas, it can be shown that the symbolic model checking process using cover is not only sound, but also precise. A similar application is shown with respect to performing abstract interpretation of programs over abstractions whose elements are quantifier-free formulas describing program states.

Following that, the description shows the application of program analysis techniques using cover to some useful theories that arise in program analysis and verification, including those that do not admit existential quantifier elimination, such as the theory of uninterpreted functions, the theory of lists and the theory of arrays. Cover is trivially defined for propositional formulas and theory of linear arithmetic, as cover, by definition, reduces to existential quantifier elimination when it exists. It is understood that embodiments of the present system may be used with program analysis techniques other than symbolic model checking and abstract interpretation, and it is understood that the present system may be used to approximate formulas that do not admit existential quantifier elimination other than the theory of uninterpreted functions, the theory of lists and the theory of arrays.

Lastly, the description sets forth how the notion of cover may be used as an extension of the known Nelson-Oppen methodology to obtain a cover process for a combination of two theories $T_1 \cup T_2$. However, in the combination framework, conditional variable equalities (of the form $\gamma \Rightarrow v_1 = v_2$) and variable-term equalities (of the form $\gamma \Rightarrow v = t$) are exchanged between component theories. The combination process works for theories that are convex, stably infinite, disjoint, and have a finite set of simple terms, as defined hereinafter. The theories of linear arithmetic and uninterpreted functions, for example, satisfy these constraints.

Qualitatively, a cover process is a method which allows a sound and precise approximation of formulas in theories that do not admit existential quantifier elimination. In case a theory does not admit existential quantifier elimination, conventional program analysis and verification techniques cannot be applied with both soundness and precision. However, it has been found that in order indicate that the system is valid or contains an error it is enough to determine an approximation of quantifier elimination, using the notion of cover It is noted that there is no universal method of applying cover to a given theory. That is, determining a cover process for a first theory may do nothing to inform the determination of a cover process of a second theorem. However, where a first theory may be simplified or expressed in terms of a second theory, a cover process for the second theory may have application to a first theory. For example, as explained hereinafter, using the cover algorithm for uninterpreted functions can be used to design cover algorithms for the theory of lists and arrays using cover, as the theory of lists and arrays may both be expressed in terms of uninterpreted functions.

Cover may defined for a quantifier-free formula $\phi$, containing interpreted symbols from theory T and a set of variables V, as: $C_T V: \phi$ (called the cover of $\phi$ with respect to V in T). This is the most precise quantifier-free formula in T that is implied by $\exists V: \phi$. Formally, the cover operation satisfies the following constraints:

$$(\exists V:\phi) \Rightarrow_T (C_T V:\phi)$$

$((\exists V: \phi) \Rightarrow_T \gamma) \Rightarrow_T ((C_T V: \phi) \Rightarrow_T \gamma)$, for all quantifier-free formulas $\gamma$ When the theory T is obvious from context, the subscript T may be dropped from the notation and the cover may be referred to simply as $CV: \phi$.

Intuitively, applying the cover operation on a formula with respect to V eliminates all variables in V from the formula. However, the resulting formula only retains quantifier-free facts pertaining to other variables in the formula. For an example, let $\phi$ be the formula y=Mem(a+x)−Mem(b+x), where Mem is an uninterpreted function. Using cover to eliminate the variable x:

$$(C_x: y=\text{Mem}(a+x)-\text{Mem}(b+x)) \equiv (a=b \Rightarrow y=0)$$

$\exists x: \phi$ implies the right hand side of the above equation. This is the most precise quantifier-free formula that is implied by $\phi$ and that does not involve x. A process is provided in the Appendix A attached hereto to computes the cover of this formula. Applying cover does not retain quantified facts. For example, $Cx: \phi$ does not imply the fact ($\forall x$: Mem(a+x)=Mem(b+x))$\Rightarrow$y=0, while $\exists x: \phi$ does.

This distinguishing fact of cover allows this operation to be defined for several useful theories including those that do not admit existential quantifier elimination. A significant application of the cover process is to allow symbolic model checking to reason about transition systems that involve rich operations from theories like uninterpreted functions, lists, and arrays. Such systems naturally arise in program analysis and software verification. Further details relating to conventional symbolic model checking systems are disclosed in Edmund M. Clarke, Jr., et al., "Model Checking," *MIT Press,* 1999, which publication is incorporated by reference herein in its entirety.

Referring to FIG. 1, qualitatively, a model checking operation involves computing all possible sets of reachable states of the model under consideration (step 100). The model checking operation also computes all possible error states (step 102). The model then determines whether a set of the reachable states intersects an error state (step 104). If so, the model has an error. The fact of the error is stored (step 106) and reported (step 108). As indicated above reporting may include one or more of the steps of displaying, printing, playing over a speaker, communicating the result over a transmission medium, and sending the results to a file for storage or use by another application program. The step of reporting may include other tangible results in alternative embodiments.

The model determines no set of the reachable states intersects an error state in step 104, the model is operationally sound. This result is stored (step 110) and reported (step 112).

A transition system can be described by the tuple (V, I(V), T($V_{old}$, $V_{new}$), E(V)), where V represents the set of state variables, I(V) is a formula describing the set of initial states, T($V_{old}$, $V_{new}$) is a formula describing the transition relation between the old values $V_{old}$ and new values $V_{new}$ of the variables in V, and E(V) is a formula describing the set of error states. For clarity, if $\phi$(V) is a formula with variables from V, $\phi$(V') may be used to be the formula obtained from $\phi$ by renaming each variable in V with the corresponding variable in V'.

Figure 2:
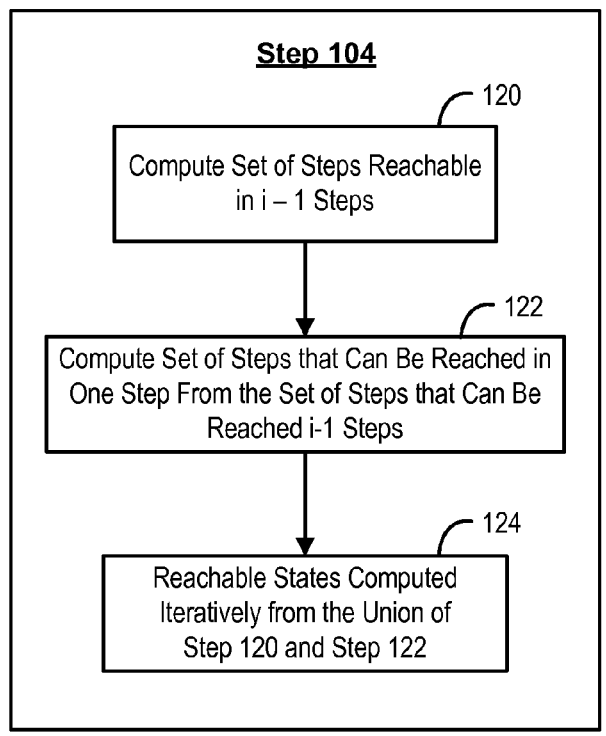
FIG. 2 is a flowchart for determining whether set of reachable states in the model checking method of FIG. 1 interesects with an error state.

Referring to FIG. 2, given a transition system, the symbolic model checking process computes the set of reachable states R(V) iteratively in step 120 as follows (steps 122 and 124):

$$R_0(V) = I(V) \qquad [1]$$

$$R_i(V) = R_{i-1}(V) \vee (\exists V_{old}: R_{i-1}(V_{old}) \wedge T(V_{old}, V)) \text{ for } i>0 \qquad [2]$$

Figure 3:
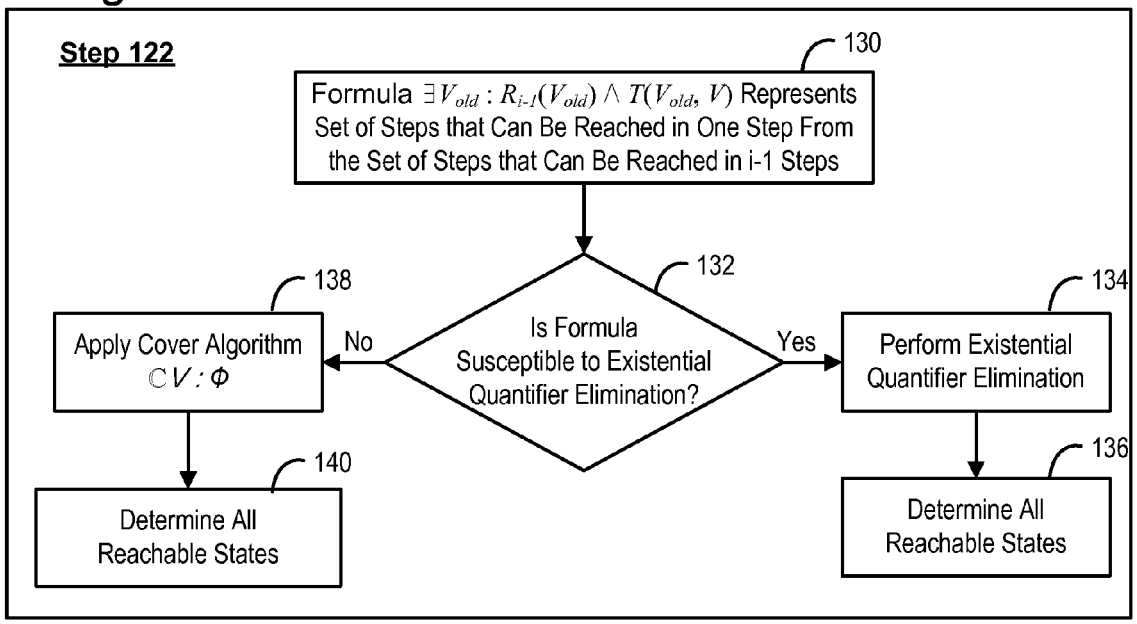
FIG. 3 is a flowchart for computing the set of steps that can be reached in one step from the set of steps that can be reached i–1 steps in the model checking method of FIG. 2.
Figure 4:
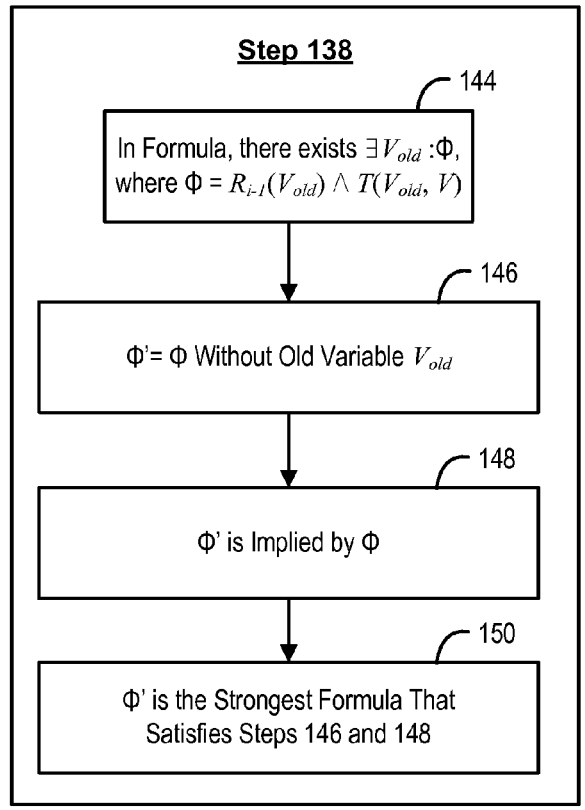
FIG. 4 is a flowchart illustrating the steps in applying a cover process to the model checking method of FIG. 3.

Referring to FIG. 3, equation [2] represents the set of steps that can be reached in one step from the set of steps that can be reached i−1 steps (step 130). This iteration reaches a fix point at n if and only if $R_n(V) \Rightarrow R_{n-1}(V)$. At this point, $R_n(V)$ is an inductive invariant of the transition system. Also, if $R_n(V) \Rightarrow \neg E(V)$ then the system does not reach an error state.

A transition system (V, I(V), T($V_{old}$, $V_{new}$), E(V)) is quantifier-free when the formulas I(V), T($V_{old}$, $V_{new}$), and E(V) are all quantifier-free. Where the system admits existential quantification, the quantifier may be eliminated from all such terms (step 134) and all reachable states may be determined (step 136).

However, in practice, transition systems arising from most software verification applications are not quantifier-free. For such systems, a new symbolic model checking process may be provided that uses the cover operation (step 138) instead of existential quantification. This new process is both sound (reliable when proving a formula) and precise (reliable when disproving a formula). Moreover, this process terminates whenever the original model checking process terminates.

In the discussion below, it is assume that the transition system uses operations from a theory T, such as the union of the theory of reals, uninterpreted functions, lists, and arrays. The cover operations are performed with respect to this theory. An actual cover process is set forth hereinafter in connection with the disclosure of the cover function applied to the theory of uninterpreted functions, lists and arrays.

Recall that there exists $\exists V_{old}:\phi$, where $\phi = R_{i-1}(V_{old}) \wedge T(V_{old}, V)$. This shown as step 144 in FIG. 4. The symbolic model checking ("SMC") process using cover may be used to compute the set of reachable states CR(V) iteratively as follows:

$$CR_0(V) = I(V) \qquad [3]$$

$$CR_i(V) = CR_{i-1}(V) \vee (C_{V_{old}}: CR_{i-1}(V_{old}) \wedge T(V_{old}, V)) \text{ for } i>0 \qquad [4]$$

$CR_i(V)$ determines the set of reachable states determined using the cover operation after i iterations. The fix point is reached, as before, at point n when $CR_n(V) \Rightarrow CR_{n-1}(V)$.

It is noted that the equations [3] and [4] are identical to the conventional symbolic model checking equations from [1] and [2] above, with the exception that the $\exists V_{old}$ term has been replaced by the cover term $CV_{old}$. In the equations [3] and [4] above, the set of reachable states R(V) is computed using the cover process to compute $\Phi'$ from $\Phi$, where $\Phi' \Rightarrow \Phi$ without the old variable $V_{old}$ (step 146). It is noted that according to the cover process, $\Phi'$ is implied by $\Phi$ (step 148). That is, $\Phi'$ is an approximation of $\Phi$. $\Phi'$ is also the strongest formula that satisfies steps 146 and 148 (step 150). That is, it turns out the $\Phi$ is not necessary to determine all reachable states. All reachable states may alternatively be determined using the approximation $\Phi'$ of $\Phi$. Once the cover process is applied (step 138, FIG. 3), all reachable states may then be determined (step 140) as if quantifier elimination had been used.

Lemma 1. Given a quantifier-free transition system (V, I(V), T($V_{old}$, $V_{new}$), E(V)), $CR_n(V) \Rightarrow \phi$ if and only if $R_n(V) \Rightarrow \phi$ for all quantifier-free formulas $\phi$.

The proof is by induction on i and relies on the fact that, in each iteration, the cover operation maintains all quantifier-free facts related to the state variables. In effect, this lemma ensures that the SMC-Cover process maintains all quantifier-free invariants of the system. Using Lemma 1 and the following properties 1 and 2 of cover, the result stated in Theorem 1 may be proven.

Property 1. $CV: CW: \phi(V, W) \equiv CV, W: \phi(V, W)$

Property 2. $CV: \exists W: \phi(V, W) \equiv CV: CW: \phi(V, W)$

Theorem 1. Given a transition system $(V, I(V), T(V_{old}, V_{new}), E(V))$, where both $T(V_{old}, V_{new})$ and $E(V)$ are quantifier-free, then the symbolic model checking process using cover is sound and precise. Furthermore, the symbolic model checking process using cover terminates whenever the symbolic model checking process terminates.

Abstract Interpretation is a well-known methodology to analyze programs over a given abstraction. Such a methodology is described for example in P. Cousot and R. Cousot, "Abstract interpretation: A unified lattice model for static analysis of programs by construction or approximation of fixpoints," *In POPL*, 1977, which publication is incorporated by reference herein in its entirety. An abstract interpreter performs a forward analysis on the program computing invariants (which are elements of the underlying abstract lattice over which the analysis is being performed) at each program point. The invariants are computed at each program point from the invariants at the preceding program points in an iterative manner using appropriate transfer functions.

Most of the abstract interpreters that have been described in literature operate over an abstraction whose elements are usually a conjunction of atomic predicates in some theory, for example linear arithmetic (See, e.g., Cousot and N. Halbwachs, "Automatic discovery of linear restraints among variables of a program," *In 5th ACM Symposium on POPL*, pages 84-96, 1978) and for example uninterpreted functions (See, e.g., S. Gulwani and G. C. Necula, "A polynomial-time algorithm for global value numbering," *In Static Analysis Symposium*, volume 3148 of LNCS, pages 212-227, 2004). These abstractions cannot reason about disjunctive invariants in programs and there is a loss of precision at join points in programs.

Abstractions whose elements are boolean combinations of atomic predicates in an appropriate theory can reason about disjunctive invariants in programs. The join operation (required to merge information at join points) for such an abstraction is simply disjunction, while the meet operation (required to gather information from conditional nodes) is simply conjunction. However, the strongest post-condition operation (required to compute invariants across assignment nodes) is non-trivial. In fact, it is exactly the cover operation for the underlying theory. Hence, a cover operation for a theory can be used to perform abstract interpretation of programs over an abstraction whose elements are quantifier-free formulas over that theory.

A sample computer code is shown below whose loop invariant (required to prove the assertion) can be generated using cover operation:

```
void foo(int* a, int* b) {
    int y = 0; int x = *;
    while(*) { y = y + a[x] – b[x]; x = *; }
    if (y ≠ 0) {assert(a ≠ b); }
}
```

No existing abstract interpreter is known to the inventors that can prove the assertion in the program. For this, abstract interpretation is needed over the abstraction of quantifier-free formulas in the combined theory of linear arithmetic and uninterpreted functions. Analyzing the first loop iteration involves computing the strongest post-condition of $y=0$ with respect to the assignment $y:=y+a[x]-b[x]$ (in the abstraction of quantifier-free formulas), which is equivalent to computing $Cx', y': (y'=0 \land y=y'+Mem(a+x')-Mem(b+x') \land x=*)$, where Mem denotes the deference operator and can be regarded as an uninterpreted function. This yields the formula $a=b \Rightarrow y=0$, which also turns out to be the loop invariant and hence fixed point is reached in the next loop iteration.

Furthermore, the invariant computed at the end of the procedure can be turned into a procedure summary by eliminating the local variables of the procedure, again by using the cover operation. Procedure summaries are useful in performing a context-sensitive reasoning of a program in a modular fashion.

The following description presents cover processes for some useful theories that arise in program analysis and software verification. Only those theories that do not admit existential quantifier elimination are considered. It is understood that the present system may to additional theories, whether they admit existential quantifier elimination or not.

Property 3. The cover operation distributes over disjunctions, i.e., $$(C_{V:(\phi_1 \lor \phi_2)}) \equiv (C_{V:\phi_1}) \lor (C_{V:\phi_2})$$

Hence, without loss of any generality, it can be assumed that the formula $\phi$ that is an input to a cover process is a conjunction of ground facts.

The cover process for theory of uninterpreted functions is given in the Appendix A to this application. The process assumes that there are only binary uninterpreted functions, but it can be easily extended to handle uninterpreted functions of any arity. A significant observation used in the process is that if $\phi$ implies $(s_1 \neq t_1 \lor \ldots \lor s_a \neq t_a) \lor (s'_1 = t'_1 \lor \ldots \lor s'_b = t'_1)$, then it must be the case that $\phi$ implies $(s_1 = t_1 \land \ldots \land s_a = t_a) \Rightarrow s'_i = t'_i$ for some $1 \leq i \leq b$. Lines 12 and 14 in the function $ComputeCover_{uf}(\phi)$ compute all such implied equalities.

Line 1 involves computing a congruence closed graph G that represents the equalities implied by $\phi$. G is a set of congruence classes, and each congruence class is a set of nodes n, where a node is either a variable y, or a F-node $F(c_1, c_2)$ for some congruence classes $c_1$ and $c_2$. Two nodes $n_1$ and $n_2$ in G are in the same congruence class if and only if $\phi$ implies $n_1 = n_2$. The function Rep(c) returns a representative term for class c that does not involve any variables in V, if any such term exists; otherwise it returns $\bot$.

Line 2 calls procedure Mark that takes a congruence closed graph G and a set of variables V as inputs, and sets M[n] to 1 for F-nodes n if and only if node n in G becomes undefined if variables V are removed from G. An F-node $F(c_1, c_2)$ is undefined if and only if classes $c_1$ or $c_2$ are undefined. A class c is undefined if and only if it contains all undefined nodes. The function AllMark takes a congruence class c as an input and returns true if and only if all nodes in c are marked.

Lines 5 through 8 compute $W[n_1, n_2]$, which denotes the weakest constraint not involving variables in V and which along with $\phi$ implies $n_1 = n_2$. $W[n_1, n_2]$ is first initialized to Init($n_1, n_2$), which returns a constraint not involving variables in V and which along with $\phi$ implies $n_1 = n_2$. $W[n_1, n_2]$ is then updated in a transitive closure style.

Line 4 initializes result to all equalities and disequalities that are implied by $\phi$ and that do not involve any variables in V. Lines 12 and 14 then update result by conjoining it with all implied equalities that are implied by $\phi$ and that do not involve any variable from V. Lines 11-12 can be treated as a special case of lines 13-14 when the context Z does not contain any holes (i.e., k=0).

The following shows an example of the cover operation over the theory of uninterpreted functions.

$$\text{Formula } \phi: s_1 = F(z_1, v) \land s_2 = F(z_2, v) \land t = F(F(y_1, v), F(y_2, v)) \quad [5]$$

$$Cv: \phi: \bigwedge_{i,j \in \{1,2\}} y_1 = z_1 \land y_2 = z_j \Rightarrow t = F(s_1, s_j) \quad [6]$$

The formula [6] can be obtained from the formula [5] by applying the process given in Appendix B (described below) as follows. Let $n_1$ be the node $F(y_1,v)$, $n_2$ be the node $F(y_2,v)$, and n be the node $F(n_1,n_2)$. $W[s_1,n_1]$ is the constraint $z_1=y_1$ and $W[s_1,n_2]$ is the constraint $z_2=y_1$. Consider the context $Z[n_1,n_2]=F(n_1,n_2)$. By choosing the node $m_1$ to be $s_1$ and $m_2$ to be $s_1$ in line 13, the formula $z_1=y_1 \land z_2=y_1 \Rightarrow t=F(s_1,s_1)$ may be obtained in line 14, and so on.

The complexity of the process described in Appendix B can be exponential in the size of the input formula $\phi$. This is because there can be an exponential number of ways of choosing an appropriate sequence of k nodes $m_1, \ldots, m_k$ in line 13. Hence, the size of the cover can itself be exponential in size of the input formula $\phi$. The formula $\phi$ in [5] can be easily generalized to obtain a formula of size O(n) whose cover is of size $O(2^n)$.

For the special case when the formula $\phi$ involves only unary uninterpreted functions, the cover process involves erasing variables in V from congruence closure of $\phi$. Equivalently, the process only involves Lines 1 through 4 in the ComputeCover procedure described in Appendix B. The complexity of the cover process for unary uninterpreted functions is thus O(n log n), where n is the size of the input formula.

The theory of lists involves three interpreted symbols car, cdr, and cons, which can be used to reason about lists and structures in programs. Further detail relating to the theory of lists are set forth in D. C. Oppen, "Complexity, convexity and combinations of theories," *In Theoretical Computer Science*, volume 12, pages 291-302, 1980, which publication is incorporated by reference herein in its entirety. Apart from the axioms from the theory of uninterpreted functions, this theory involves the axiom $\forall x, y$: car(cons(x, y))=x $\land$ cdr(cons(x,y))=y.

Using the insight from Oppen, incorporated in the previous paragraph, the cover process for the theory of lists involves eliminating the occurrence of the cons symbol from a formula and reasoning entirely in the theory of uninterpreted functions. The process relies on the following lemma.

Lemma 2. Given a quantifier-free formula $\phi$ in the theory of lists that does not contain the cons symbol, then $C_{lists}V: \phi \equiv C_{uf}V: \phi$ With respect to the algorithm below, given a quantifier-free formula $\phi(V)$ involving variables from V, one can construct an equisatisfiable formula $\phi'(V, V')$ without the cons symbol as follows. Replace each term cons(x, y) in the formula by a new variable v' and conjoin the formula with car(v')=x $\land$ cdr(v')=y. If V' is the set of all the introduced new variables, the new formula $\phi'(V, V')$ satisfies the property that $\phi(V) \equiv \exists V': \phi'(V, V')$. Using Property 1, Property 2, and Lemma 2:

$$C_{lists}W:\phi(V) \equiv C_{uf}W,V':\phi'(V,V').$$

The cover process for the theory of lists involves applying the cover process for uninterpreted functions, described above, on $\phi'(V, V')$. As car and cdr are unary functions, one can apply the optimization described above with respect to unary uninterpreted functions.

The theory of arrays involves two interpreted symbols, select and update, such that $\forall a, i, v, j$: select(update(a, i, v), j)=ite(i=j, v, select(a, j)). Here, ite is the if-then-else operator that returns the second argument when the predicate in the first argument is true and the third argument. The cover process for the theory of arrays is very similar to the theory of lists. Informally, the process is similar to the cover process for the theory of lists described above. It involves iteratively eliminating the update symbol from the input formula and then invokes the cover process for the uninterpreted functions.

The following describes how to obtain a cover process for combination of two theories $T_1 \cup T_2$ from the cover processes for the individual theories $T_1$ and $T_2$. The combination methodology is based on extension of Nelson-Oppen methodology for combining decision procedures for two theories. Nelson and Oppen provided a framework for deciding formulas over multiple theories by modularly combining decision procedures for the different theories. Their framework is described in a paper: G. Nelson and D. C. Oppen, "Simplification by cooperating decision procedures," *ACM Transactions on Programming Languages and Systems*, (*TOPLAS*), 2(1):245 257, 1979, which paper is incorporated by reference herein in its entirety. As a result of this methodology, the restrictions on theories that allow for efficient combination of their decision procedures (namely, convexity, stably infiniteness, and disjointness) also transfer to the context of combining cover processes for those theories.

The Nelson-Oppen methodology for combining decision procedures involves sharing variable equalities v=u between the formulas in the two theories. For combining cover processes, variable-term equalities (i.e., equalities between variables and terms) also need to be shared apart from variable equalities. Furthermore, these equalities may also be conditional on any predicate. More formally, the general form of equalities that are shared between the two formulas in the two theories is $\gamma \Rightarrow v=t$, where $\gamma$ is a formula that does not involve any variable to be eliminated, and either v and t are both variables (in which case we refer to it as a conditional variable equality) or v is a variable that needs to be eliminated and t is a term that does not involve any variable to be eliminated (in which case we refer it to as a conditional variable-term equality). The terms t are restricted to come from a set that may be referred to as set of simple terms (See Definition 1 below).

Some notation is provided for the description of the cover process for combination of two theories.

Definition 1 (Set of Simple Terms). A set S is a set of simple terms for variable v with respect to a formula $\phi$ in theory T (denoted by $SST_T(v, \phi)$), if for all conjunctions of atomic predicates $\gamma$ such that $v \notin Vars(\gamma)$, and all terms t that are distinct from v:

$$v \notin Vars(S) \text{ and } Vars(S) \subseteq Vars(\phi)$$

$$(\gamma \land \phi \Rightarrow_T v=t) \Rightarrow \exists t' \in S. t. (\gamma \land \phi \Rightarrow_T v=t') \land (\gamma \land \phi \Rightarrow_T t=t')$$

The theories of linear arithmetic and uninterpreted functions admit a finite set of simple terms for their formulas. The following theorems describe how to compute a set of simple terms for a formula in the corresponding theory.

Theorem 2 (Set of Simple Terms for Linear Arithmetic). Let $\phi$ be the formula $$\bigwedge_{i=1}^{n} v \leq a_i \wedge \bigwedge_{i=1}^{m} v \geq b_i \wedge \bigwedge_{i=1}^{n'} v < a'_i \wedge \bigwedge_{i=1}^{m'} v > b'_i \wedge \phi'.$$

where $v \notin \text{Vars}(\phi')$, $v \notin \text{Vars}(a_i)$ and $v \notin \text{Vars}(b_i)$. Then, $$\{a_i\}_{i=1}^{n}$$

is $\text{SST}_{ta}(v, \phi)$.

Theorem 3 (Set of Simple Terms for Uninterpreted Functions). Let $\phi$ be a formula over the theory of uninterpreted functions. Let G be the congruence closure of $\phi$. Let S be a set that contains a representative term not involving v for each congruence class in G (if any such term exists). Then S is $\text{SST}_{uf}(v, \phi)$.

The proofs of Theorem 2 and Theorem 3 are given in full in the paper by Gulwani and M. Musuvathi, "Cover algorithms and their combination," Technical Report MSR-TR-2006-09, Microsoft Research, January 2006, which paper is incorporated by reference herein in its entirety.

The notation $\text{WC}_T(\phi, \delta, V)$ may be used to denote $\neg C_T V$: $\phi \wedge \neg \delta$. Intuitively, $\text{WC}_T(\phi, \delta, V)$ denotes the weakest constraint that together with $\phi$ implies $\delta$ and that does not involve any variable from set V.

The notation Num(T) may be used for any theory T to denote the maximum number of variables that may occur in any atomic predicate in theory T. For example, Num(T)=2 for difference logic (theory of linear arithmetic with only difference constraints) as well as for theory of unary uninterpreted functions.

The procedure ComputeCover$_{T1 \cup T2}$ in Appendix B takes as input a formula $\phi$ and a set of variables V to be eliminated and computes $C_{T1 \cup T2} V: \phi$ using the cover processes for theories $T_1$ and $T_2$. Line 1 performs purification of $\phi$, which involves decomposing $\phi$ (which is a conjunction of atomic predicates in the combined theory $T_1 \cup T_2$) into conjunctions of atomic predicates that are either in theory $T_1$ or in $T_2$ by introducing a fresh variable for each alien term in $\phi$. The set of all such fresh variables is referred to as U, while V' denotes the set of all variables that we need to eliminate from $\phi_1 \wedge \phi_2$. Lines 4 to 11 repeatedly exchange conditional variable equalities and conditional variable-term equalities between $\phi_1$ and $\phi_2$. Lines 13 and 14 call the procedure ComputeSimpleCover$_T$, which takes as inputs a set of variables V, a formula $\phi$ in theory T, and a formula F of the form $\gamma_i \Rightarrow_T v_i = t_i$ (where $v_i \in V$ and T' is any theory) such that $V \cap (\text{Vars}(\gamma_i) \cup \text{Vars}(t_i)) = 0$, and computes $C_{T \cup T'} V: \phi \wedge F$.

The proof of correctness (including termination) of the algorithm ComputerCover$_{T1 \cup T2}$ is non-trivial and is given in the paper to Gulwani and M. Musuvathi, previously incorporated by reference. A brief sketch of the proof follows. Let $\gamma_i$'s be some atomic predicates that do not involve variables in V and furthermore $\phi \Rightarrow \gamma_1 \vee \ldots \vee \gamma_k$. The formula ComputeCover$_{T1 \cup T2}$ (V, $\phi$) $\wedge \neg \gamma_1 \vee \ldots \vee \neg \gamma_k$ is shown to be unsatisfiable by simulating the decision procedure for theory T1∪T2 based on Nelson-Oppen's combination methodology (with the knowledge of the Nelson-Oppen proof of unsatisfiability of the formula $\phi \wedge \neg \gamma_1 \wedge \ldots \wedge \neg \gamma_k$).

The complexity of the cover process for combination of two theories is an exponential (in size of the input formula $\phi$ and cardinality of its set of simple terms) factor of the complexity of the cover processes for individual theories. For combination of difference logic (theory of linear arithmetic with only difference constraints) and unary uninterpreted functions, which is a useful combination that occurs in practice, the cover process can be simplified and it runs in time polynomial in size of the input formula $\phi$.

Some examples of computation of cover are now presented for the combined theory of linear arithmetic (la) and uninterpreted functions (uf). Example 2 demonstrates the importance of sharing variable-term equalities, while example 3 demonstrates the importance of sharing conditional equalities.

Example 2 Compute $\text{Cl}_{a \cup uf}\{v_1, v_2\}$: $\phi$, where $\phi$ is $(a \leq v_{1+1} \wedge v_1 \leq a-1 \wedge v_2 \leq b \wedge v_1 = F(v_3) \wedge v_2 = F(F(v_3)))$, for some uninterpreted function F.

First, $\phi$ is decomposed into pure formulas $\phi_1$ and $\phi_2$:

$\phi_1 = (a \leq v_1 + 1 \wedge v_1 \leq a-1 \wedge v_2 \leq b)$ $\phi_2 = (v_1 = F(v_3) \wedge v_2 = F(F(v_3)))$ Then, variable-term equalities are shared between $\phi_1$ and $\phi_2$ as follows:

$$\phi_1 \xrightarrow{v_1 = a-1} \phi_2 \xrightarrow{v_2 = F(a-1)} \phi_1$$

Then, $C_{ta}\{x, u_1, u_2, u_3, u_4\}$: $\phi_1 \wedge v_2 = F(a-1)$ may be computed to obtain the result $F(a-1) \leq b$. The cover process for linear arithmetic does not need to understand the term $F(a-1)$ and can just treat it as some fresh variable.

Example 3 Compute $C_{ta \cup uf} x$: $\phi$, where $\phi$ is (y=Mem(a+x)−Mem(b+x)) for some uninterpreted function Mem.

Purifying $\phi$, $\phi_1$ and $\phi_2$ may be obtained by introducing new variables u1, $u_2$, $u_3$, $u_4$.

$\phi_1 = (y = u_1 - u_2 \wedge u_3 = a+x \wedge u_4 = b+x)$ $\phi_2 = (u_1 = \text{Mem}(u_3) \wedge u_2 = \text{Mem}(u_4))$ Conditional equalities may then be shared between $\phi_1$ and $\phi_2$ as follows:

$$\phi_1 \xrightarrow{a=b \Rightarrow u_3 = u_4} \phi_2 \xrightarrow{a=b \Rightarrow u_1 = u_2} \phi_1$$

Then, $C_{ta}\{x, u_1, u_2, u_3, u_4\}$: $\phi_1 \wedge a=b \Rightarrow u_1 = u_2$ may be computed to obtain the result $a=b \Rightarrow y=0$.

As set forth above, the notion of cover presents the most precise quantifier-free over-approximation to existential quantifier elimination. Also, the notion of cover can be parameterized by types of formulas that one is interested in. Instead of generating the most precise quantifier-free formula, one may be interested in formulas that are conjunctions of, for example, atomic predicates, or at most k disjunctions of atomic predicates, or implications of the form $\phi_1 \Rightarrow \phi_2$, where $\phi_1$ and $\phi_2$ are conjunctions of atomic predicates in variables $V_1$ and $V_2$ respectively. The latter may be useful in computing procedure summaries, where $V_1$ and $V_2$ denote the set of input and output variables respectively.

Figure 5:
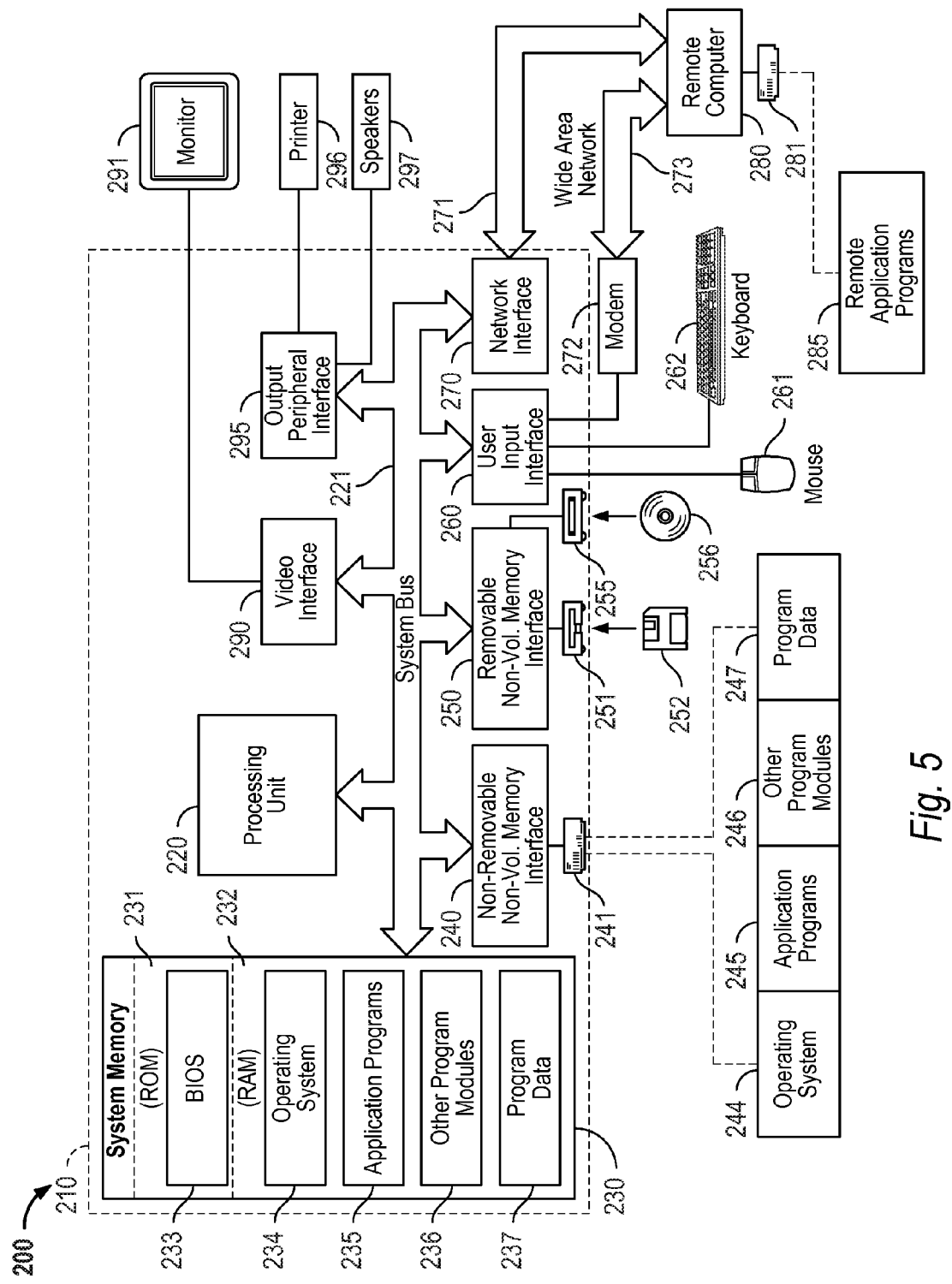
FIG. 5 is a block diagram of a computing system environment capable of implementing the present system.

FIG. 5 illustrates an example of a suitable general computing system environment 200 that may comprise any processing device shown herein on which the inventive system may be implemented. The computing system environment 200 is only one example of a suitable computing environment and is not intended to suggest any limitation as to the scope of use or functionality of the inventive system. Neither should the computing system environment 200 be interpreted as having any dependency or requirement relating to any one or combination of components illustrated in the exemplary computing system environment 200.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 5, an exemplary system for implementing the inventive system includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 may include a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 230 includes computer storage media in the form of volatile and/or nonvolatile memory such as ROM 231 and RAM 232. A basic input/output system (BIOS) 233, containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 5 illustrates operating system 234, application programs 235, other program modules 236, and program data 237.

The computer 210 may also include other removable/non-removable, volatile/nonvolatile computer storage media. By way of example only, FIG. 5 illustrates a hard disc drive 241 that reads from or writes to non-removable, nonvolatile magnetic media and a magnetic disc drive 251 that reads from or writes to a removable, nonvolatile magnetic disc 252. Computer 210 may further include an optical media reading device 255 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 241 is typically connected to the system bus 221 through a non-removable memory interface such as interface 240, magnetic disc drive 251 and optical media reading device 255 are typically connected to the system bus 221 by a removable memory interface, such as interface 250.

The drives and their associated computer storage media discussed above and illustrated in FIG. 5, provide storage of computer readable instructions, data structures, program modules and other data for the computer 210. In FIG. 5, for example, hard disc drive 241 is illustrated as storing operating system 244, application programs 245, other program modules 246, and program data 247. These components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and a pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 5. The logical connections depicted in FIG. 5 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communication over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 5 illustrates remote application programs 285 as residing on memory device 281. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

APPENDIX A

Cover Process for Theory of Uninterpreted Functions

```
ComputeCover_uf(φ, V) =
1    Let G be the congruence closure of φ.
2    Mark(G,V);
3    let G' be the graph obtained from G after removing all
odes n s.t. M[n] = 1;
4    result ← all equalities and disequalities implied by G';
// Compute W[n_1,n_2 2]
5    forall nodes n_1, n_2 ∈ G: W[n_1, n_2] ← Init(n_1, n_2);
6    forall nodes n ∈ G:
7        forall nodes n_1,n_2 ∈ G:
8            W[n_1,n_2] ← W[n_1,n_2] ∨ (W[n_1,n] ∧ W[n,n_2]);
// Compute result
9    let N_e = {n | n ∈ G, M[n] = 1, CRep(n) ≠ ⊥};
10   forall nodes n ∈ N_e
11       forall nodes m ∈ G s.t. W[m,n] ≠ false:
12           result ← result ∨ (W[n,m] CRep(n) = CRep(m));
13   forall contexts Z[n_1, ..., n_k] s.t. n = Z[n_1, ..., n_k],
Vars(Z) ∩ V = ∅, n_i ∈ N_e for 1 ≤ i ≤ k
14       forall nodes m_1, ..., m_k ∈ G s.t. W[n_i,m_i] ≠ false
and CRep(m_i) ≠ ⊥ for 1 ≤ i ≤ k:
15           result ← result ∧
```

$$\left(\left(\bigwedge_{i=1}^{k} W[c_i, d_i]\right) \Rightarrow CRep(n) = Z[CRep(m_1), \ldots, CRep(m_k)]\right);$$

```
16   return result;
Mark(G,V) =
forall nodes n ∈ G: M[n] ← 0;
forall variables y ∈ V : M[y] ← 1;
while any change
forall nodes F(c_1, c_2) : if AllMark(c_1) ∨ AllMark(c_2), M[F(c_1, c_2] ← → 1;
AllMark(c) =
forall nodes n in class c: if M[n] = 0, return false;
```

-continued

```
return true;
Init(n_1,n_2) =
if Class (n_1) = Class (n_2), return true;
if n_1 = F(c_1,c_2) and n_2 = F(c'_1, c'_2)
if Rep(c_1) ≠ ⊥ ∧Rep(c'_1) ≠ ⊥ ∧c_2 = c'_2, return Rep(c_1) = Rep(c'_1);
if Rep(c_2) ≠ ⊥ ∧Rep(c'_2) ≠ ⊥ ∧c_1 = c'_1, return Rep(c_2) = Rep(c'_2);
return Init(c_1, c'_1) ∧Init(c_2,c_2);
return false;
Rep(c) =
if AllMark(c) return ⊥;
if c has a variable y s.t. M[y] = 0, return y;
let F(c_1, c_2) be the node s.t. M[F(c_1, c_2)] = 0. return F(Rep(c_1), Rep(c_2));
CRep(n) =
return Rep (Class (n));
```

APPENDIX B

Cover process for combination of two theories $T_1 \cup T_2$.

```
ComputeCover_{T1∪T2} (V, φ) =
1    φ_1, φ_2 = Purify(φ); let U be the variables introduced during Purify(φ);
2        let V' = V ∪ U;
3        F_1 ← true; F_2 ← true;
4    repeat until no change:
5        for j = 1, 2:
```
$n$ 6    let $\bigwedge \gamma^1_{i-1} \Rightarrow v_1 = u_i$ be some conditional variable equalities implied by $F_{3-j}$;

7    let $$\bigwedge_{i-1}^{m} \delta_i \Rightarrow w_i = t_i$$

be some conditional variable-term equalities implied by $F_{3-j}$;

9    let $\psi = \bigwedge_{i=1}^{n} \gamma_i \wedge \bigwedge_{i=1}^{m} \delta_i$;

let $E \bigwedge_{i=1}^{k} v_i = u_i$;

let $W = V' - \{w_i \mid 1 \le u \le m\}$;

let $S_v \equiv SST_T; (v, \mathbb{C}_T; W - \{v\} : \phi \wedge E)$ for any variable $v$;

10   $F_j \leftarrow F_j \wedge \bigwedge_{v_1,v_2 \in V'} \psi \wedge WC_{Tj}(\phi_j \wedge E, v_1 = v_2, W)[t_i/w_i] \Rightarrow v_1 = v_2$ 11   $\bigwedge_{v \in V', t \in S_v} \psi \wedge WC_T(\phi_j \wedge E, v = t, W)[t_i/w_i] \Rightarrow v = t]$ 12   let $F'_j$ be the conjunction of all implied variable-term equalities $\gamma \tilde{v}_i = t_i$ implied by $F_j$ s.t. Vars($\gamma_1$) ∩ V' = ∅ (for j = 1, 2);
13   let $a_1$ = ComputeSimpleCover$_{T1}$ (V', φ_1, F'_2);
14   let $a_2$ = ComputeSimpleCover$_{T2}$ (V', φ_2, F'_1);
15   return a1 ∧ a_2;
ComputesimpleCover_T (φ, V, F) =
result ← ComputeCover(V, φ);
forall collections $$\bigwedge_{i-1}^{m} \delta_i \Rightarrow w_i = t_i$$

of conditional variable-term equalities implied by F s.t. m ≤ Num(T) and w'_i are all distinct variables:
    let -continued $$\gamma = \bigwedge_{i=1}^{n} \gamma_i; \text{let} W = V - \{W_1 \mid 1 \leq i \leq m\};$$

result ← result ∧(γ ‰ ComputeCover(W, φ) [t$_i$/w$_i$]);
return result;

We claim:

1. A symbolic model checking method of determining the reliability of a transition system described by the tuple (V, I(V), T(V$_{old}$, V$_{new}$), E(V)), where V represents the set of state variables, I(V) is a formula describing the set of initial states, T(V$_{old}$, V$_{new}$) is a formula describing the transition relation between the old values V$_{old}$ and new values V$_{new}$ of the variables in V, and E(V) is a formula describing the set of error states, wherein the formulas I(V) and T(V$_{old}$, V$_{new}$) do not admit existential quantification, the method comprising the steps of:
 a. computing the set of reachable states CR(V) iteratively from an initial state CR$_0$(V)≡I(V), and an i$^{th}$ state CR$_i$(V)≡CR$_{i-1}$(V) (CV$_{old}$: CR$_{i-1}$(V$_{old}$) T(V$_{old}$, V)) for i>0, where the expression (CV$_{old}$: CR$_{i-1}$(V$_{old}$) T(V$_{old}$, V)) represents a set of steps that can be reached in one step from the set of steps that can be reached in i−1 steps, and
 where the i$^{th}$ state CR$_i$(V) is an approximation of the i$^{th}$ state R$_{i-1}$(V) (∃V$_{old}$: R$_{i-1}$(V$_{old}$) T(V$_{old}$, V)) for i>0 if the formulas I(V) and T(V$_{old}$, V$_{new}$) admitted existential quantifier elimination;
 b. determining all sets of error states E(V);
 c. determining the reliability of the transition system by whether there is an intersection between the reachable states determined in said step (a) and the error states determined in said step (b); and
 d. reporting the reliability determined in said step (c).

2. A method as recited in claim 1, wherein the formulas I(V) and T(V$_{old}$, V$_{new}$) contain one or more uninterpreted function symbols.

3. A method as recited in claim 1, wherein the formulas I(V) and T(V$_{old}$, V$_{new}$) contain symbols from a theory of lists.

4. A method as recited in claim 1, wherein the formulas I(V) and T(V$_{old}$, V$_{new}$) contain symbols from a theory of arrays.

5. A method as recited in claim 1, further comprising a step (d) of determining all error states for the model.

6. A method as recited in claim 5, further comprising a step (e) of determining whether there is an intersection between all reachable states determined in said steps (b) or (c) and the error states determined in said step (d).

7. A method as recited in claim 6, wherein a determination in said step (e) of no intersection indicates a valid model.

8. A method as recited in claim 7, wherein a determination in said step (e) of an intersection indicates errors in the model.

9. A method as recited in claim 8, wherein an indication of validity is reliable and an indication of an error is reliable where said formula φ does not admit existential quantification.

* * * * *

UNITED STATES PATENT AND TRADEMARK OFFICE
CERTIFICATE OF CORRECTION

PATENT NO. : 7,606,774 B2  
APPLICATION NO. : 11/425642  
DATED : October 20, 2009  
INVENTOR(S) : Musuvathi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Fourteenth Day of December, 2010

David J. Kappos  
*Director of the United States Patent and Trademark Office*